(12) United States Patent
Paque

(10) Patent No.: US 6,244,322 B1
(45) Date of Patent: Jun. 12, 2001

(54) MASTER PROCESSING APPARATUS WITH AN EXIT TRAY

(75) Inventor: Michael W. Paque, Cave Creek, AZ (US)

(73) Assignee: Xyron, Inc., Scottsdale, AZ (US)

(*) Notice: Subject to any disclaimer, the term of this patent is extended or adjusted under 35 U.S.C. 154(b) by 0 days.

(21) Appl. No.: 09/189,273

(22) Filed: Nov. 6, 1998

Related U.S. Application Data

(60) Provisional application No. 60/064,629, filed on Nov. 7, 1997.

(51) Int. Cl.[7] ........................................ B32B 31/00
(52) U.S. Cl. ......................... 156/555; 156/522; 156/579; 156/582; 100/176
(58) Field of Search ............................. 156/522, 555, 156/582, 579; 100/155 R, 160, 176

(56) References Cited

U.S. PATENT DOCUMENTS

| | | |
|---|---|---|
| 3,901,758 | 8/1975 | Humphries . |
| 3,944,455 | 3/1976 | French . |
| 4,060,441 | 11/1977 | Ohta et al. . |
| 4,090,911 | 5/1978 | Shaffer . |
| 4,151,900 | 5/1979 | Kirwan . |
| 4,295,921 | 10/1981 | Bopst, III . |
| 4,387,000 | 6/1983 | Tancredi . |
| 4,425,182 | 1/1984 | Jones et al. . |
| 4,505,772 | 3/1985 | Renz . |
| 4,564,411 | 1/1986 | Holzer . |
| 4,619,728 | 10/1986 | Brink . |
| 4,625,931 | 12/1986 | Tamura et al. . |
| 4,650,350 | 3/1987 | Dorner . |
| 4,704,171 | 11/1987 | Thompson et al. . |
| 5,051,147 | 9/1991 | Anger . |
| 5,139,600 | 8/1992 | Singer . |

(List continued on next page.)

FOREIGN PATENT DOCUMENTS

| | | |
|---|---|---|
| 37 37 946 | 6/1989 | (DE) . |
| 0 093 385 | 4/1983 | (EP) . |
| 0 721 838 | 7/1996 | (EP) . |
| 1189956 | 4/1970 | (GB) . |
| 1 280 015 | 7/1972 | (GB) . |
| 2 199 010 | 6/1988 | (GB) . |
| 2 230 250 | 10/1990 | (GB) . |
| 82/03356 | 10/1982 | (WO) . |
| 95/00430 | 1/1995 | (WO) . |

Primary Examiner—James Sells
(74) Attorney, Agent, or Firm—Pillsbury Winthrop LLP

(57) ABSTRACT

The present invention relates to a laminating and adhesive transfer apparatus for use with a pair of removable feed rolls. The removable feed rolls carrying a supply of stock material to be unwound. The apparatus comprises a frame constructed and arranged to removably mount the feed rolls. A pair of nip rollers are rotatably mounted to the frame. The nip rollers define a nip area therebetween with a feed side and a discharge side. An actuating mechanism is constructed and arranged to affect nip roller rotation. The frame is constructed and arranged such that, when the feed rolls are removably mounted thereto, a master can be inserted between the feed rolls, the stock materials can then be unwound from each of feed rolls so as to be disposed on opposing sides of the master, and the master and the stock materials can thereafter be fed together into the feed side of the nip rollers. The nip rollers are constructed and arranged to apply pressure to the master and stock materials being fed into the feed side of the nip rollers as a result of the nip roller rotation so as to perform a laminating or adhesive transfer process to the master and stock materials and subsequently discharge the processed master and stock materials outwardly from the discharge side. An exit tray provides a substrate supporting surface positioned and configured to receive and support the processed master and stock materials being discharged from the nip rollers in a substantially flat relation to thereby prevent downward bending of the processed master and stock materials.

62 Claims, 8 Drawing Sheets

U.S. PATENT DOCUMENTS

| | | |
|---|---|---|
| 5,163,349 | 11/1992 | Takagi et al. . |
| 5,275,868 | 1/1994 | Popat et al. . |
| 5,279,697 | 1/1994 | Peterson et al. . |
| 5,295,753 | 3/1994 | Godo et al. . |
| 5,480,509 | 1/1996 | Matsuo et al. . |
| 5,507,901 | 4/1996 | Limina et al. . |
| 5,580,417 | 12/1996 | Bradshaw . |
| 5,584,962 | 12/1996 | Bradshaw et al. . |
| 5,643,391 | 7/1997 | Couillard et al. . |
| 5,735,997 | 4/1998 | Reinders . |
| 5,735,998 | 4/1998 | Bradshaw . |
| 5,788,806 | 8/1998 | Bradshaw . |
| 5,810,967 | 9/1998 | Couillard et al. . |
| 5,961,779 * | 10/1999 | Bradshaw .............................. 156/495 |

* cited by examiner

MASTER PROCESSING APPARATUS WITH AN EXIT TRAY

This application claims benefit of provisional application No. 60/064,629, filed Nov. 7, 1997.

The present invention relates to master processing apparatuses, such as laminating and adhesive transfer apparatuses.

It is a common practice to protect documents and other items such as business cards by laminating them in clear plastic coverings. It is also a common practice to make articles such as stickers and labels by a process of adhesive transfer. U.S. Pat. Nos. 5,584,962 and 5,580,417 are directed to devices which are capable of performing both laminating and adhesive transfer operations.

The laminating or adhesive transfer operation performed by these devices, however, may result in a bending of the finished product because the product is allowed to fall downward as it is discharged from the device. Also, the finished product may be susceptible to curling caused by differences in shrinkage which occur in the manufacturing of substrate layers used to produce the final product. Thus, it can be seen that there is a need for a laminating and adhesive transfer apparatus which supports the finished product of a laminating or adhesive transfer operation in a generally horizontal orientation to prevent such curling or bending.

It is therefore an object of the present invention to meet the above-mentioned need. In order to achieve this object, there is provided a laminating and adhesive transfer apparatus for use with a pair of removable feed rolls. The removable feed rolls carrying a supply of stock material to be unwound. The apparatus comprises a frame constructed and arranged to removably mount the feed rolls. A pair of nip rollers are rotatably mounted to the frame. The nip rollers define a nip area therebetween with a feed side and a discharge side. An actuating mechanism is constructed and arranged to affect nip roller rotation. The frame is constructed and arranged such that, when the feed rolls are removably mounted thereto, a master can be inserted between the feed rolls, the stock materials can then be unwound from each of feed rolls so as to be disposed on opposing sides of the master, and the master and the stock materials can thereafter be fed together into the feed side of the nip rollers. The nip rollers are constructed and arranged to apply pressure to the master and stock materials being fed into the feed side of the nip rollers so as to perform a laminating or adhesive transfer process to the master and stock materials and subsequently discharge the processed master and stock materials outwardly from the discharge side. An exit tray provides a substrate supporting surface positioned and configured to receive and support the processed master and stock materials being discharged from the nip rollers in a substantially flat relation to thereby prevent downward bending of the processed master and stock materials.

It is also advantageous to sever the master and stock materials being discharged from the rollers. To this end, the present invention further provides a cutting assembly disposed on the discharge side of the nip rollers. The cutting assembly is positioned and configured to cut transversely through the processed master and stock materials being supported in substantially flat relation on the exit tray so as to separate a portion of the processed master and stock materials from the portion being discharged from the nip rollers. Preferably, the cutting assembly comprises a blade mounted for transverse cutting movement in a transverse direction of the tray and the tray comprises a groove formed in the substrate supporting surface and extending in the transverse direction. The blade is mounted such that a portion thereof extends into the groove and below the supporting surface, thereby enabling the blade to cut through an entire thickness of the processed master and stock materials during the transverse cutting movement.

Another aspect of the present invention relates to a cutting assembly for severing the finished product. In the apparatuses of the '417 and '962 patents, the cutting blade is mounted on a pivoting arm. Manual movement pivots the arm to move the blade into engagement with an anvil. Although this arrangement does provide a cutting function, when the blade becomes dull it may not cut effectively through the entire product thickness, thus requiring second or third cutting movements.

It is therefore an object of the present invention to provide a laminating and adhesive transfer apparatus with a cutting assembly configured to ensure that the entire thickness of the finished product is cut in one cutting stroke. In order to achieve this object, the present invention provides a laminating and adhesive transfer apparatus for use with a pair of removable feed rolls. The removable feed rolls carry a supply of stock material to be unwound. The apparatus comprises a frame constructed and arranged to removably mount the feed rolls. A pair of nip rollers are rotatably mounted to the frame. The nip rollers define a nip area therebetween with a feed side and a discharge side. An actuating mechanism is constructed and arranged to affect nip roller rotation. The frame is constructed and arranged such that, when the feed rolls are removably mounted thereto, a master can be inserted between the feed rolls, the stock materials can then be unwound from each of the feed rolls so as to be disposed on opposing sides of the master, and the master and the stock materials can thereafter be fed together into the feed side of the nip rollers. The nip rollers are constructed and arranged to apply pressure to the master and the stock materials being fed into the feed side of the nip rollers so as to perform a laminating or adhesive transfer process to the master and stock materials and subsequently discharge the processed master and stock materials outwardly from the discharge side. A substrate supporting surface is positioned and configured to receive and support a portion of the processed master and stock materials being discharged from the nip rollers. A cutting assembly is disposed on the discharge side of the nip rollers. The cutting assembly is constructed and arranged to be moved in a transverse direction so as to cut through the processed master and stock materials being supported on the surface. The cutting assembly has a blade with a portion thereof extending downwardly below the supporting surface. The downward extent of the blade portion enables the blade to cut through an entire thickness of the processed master and stock materials during the aforesaid transverse cutting movement.

Other objects, advantages, and features will become apparent from the following detailed description, the accompanying drawings, and the appended claims.

DETAILED DESCRIPTION OF THE PREFERRED EMBODIMENT OF THE INVENTION

Figure 1:
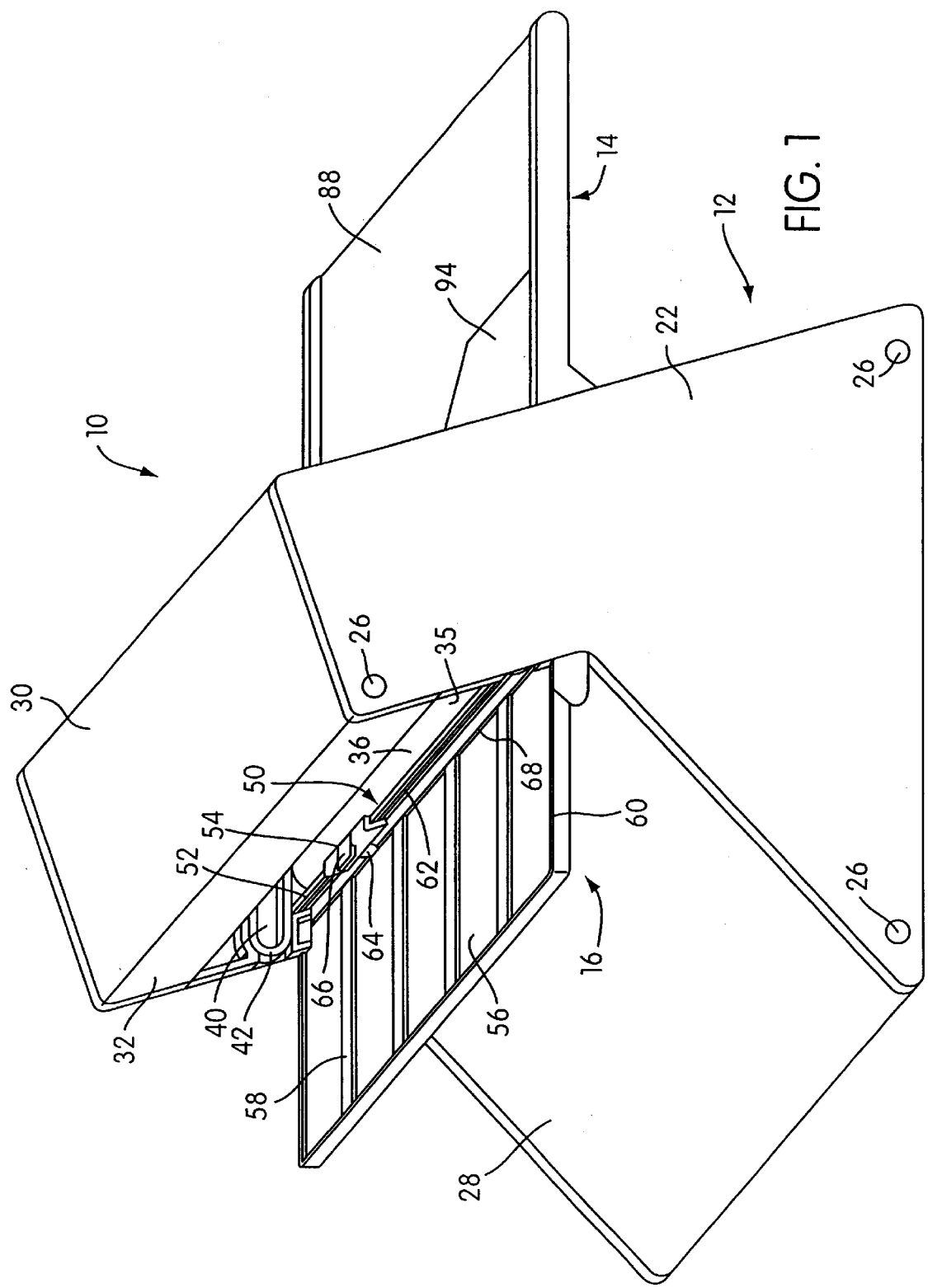
FIG. 1 is a perspective view of a laminating and adhesive transfer apparatus embodying the principles of the present invention.
Figure 3:
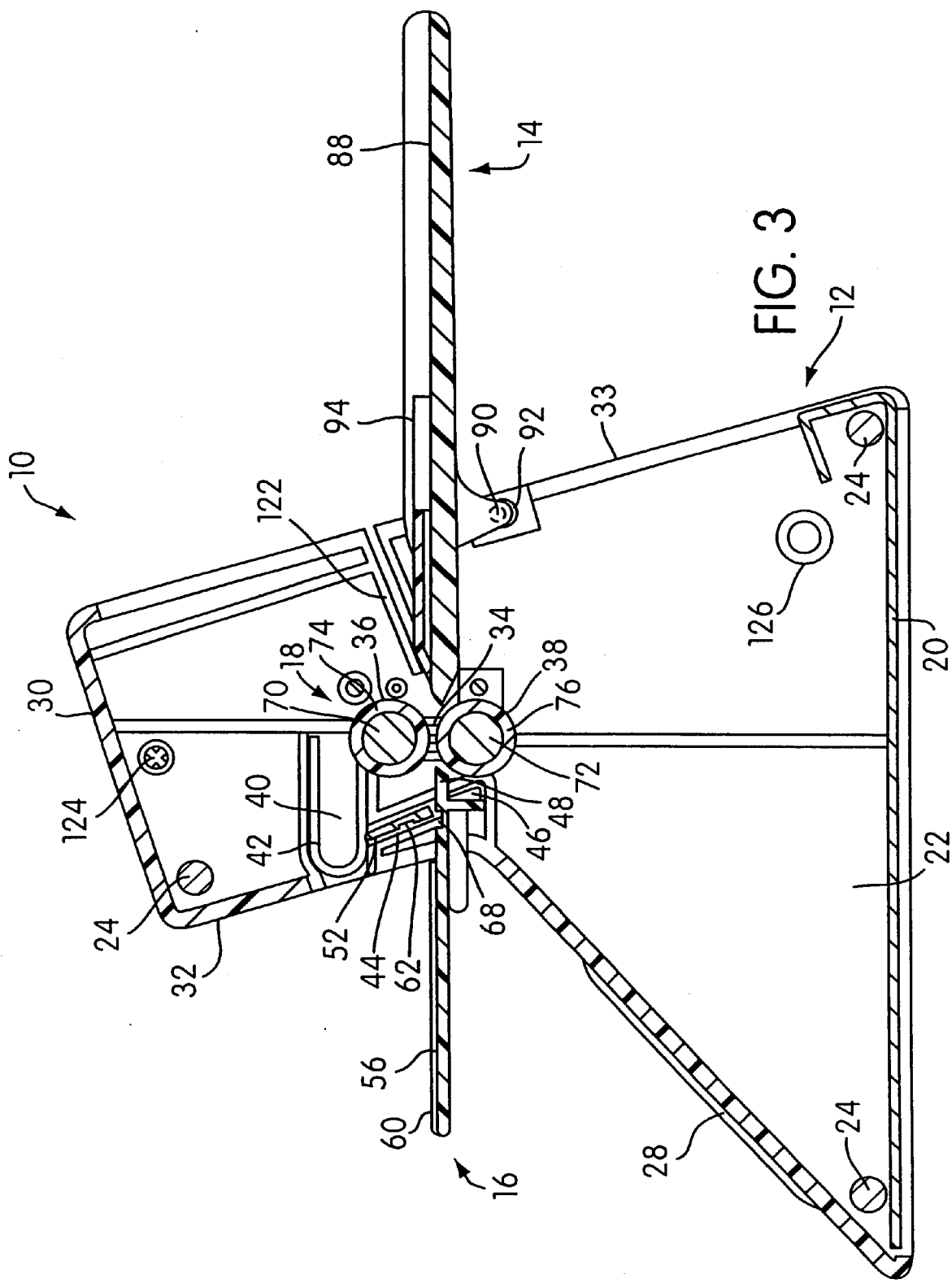
FIG. 3 is a sectional view along line 3—3 of FIG. 2.
Figure 7:
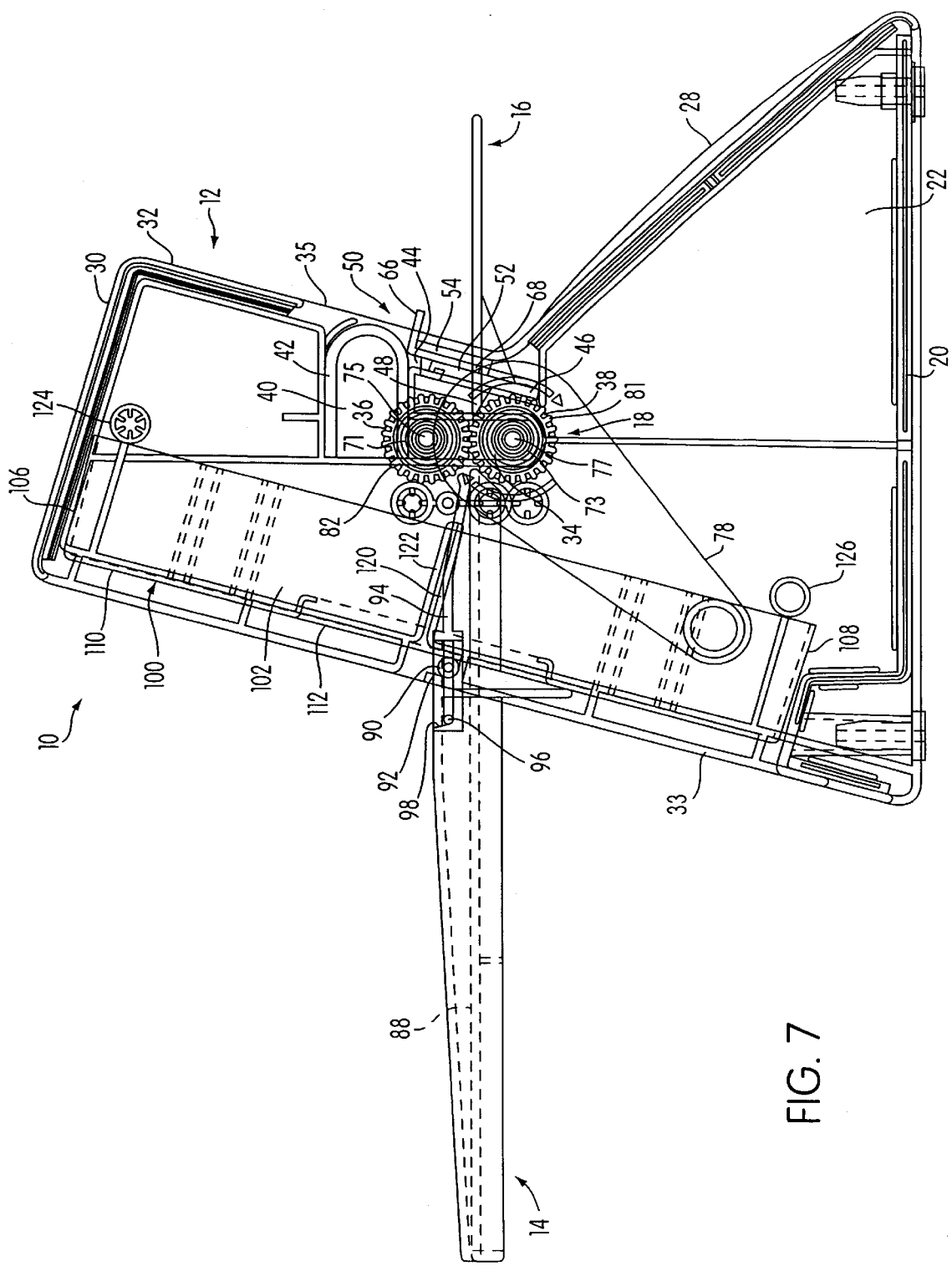
FIG. 7 is a profile view of a laminating and adhesive transfer apparatus embodying the principles of the present invention with a supply cartridge for supplying a roll of substrate material mounted therein and having a transparent side wall to illustrate the interior of the apparatus.

FIG. 1 illustrates a laminating and adhesive transfer apparatus, generally indicated at 10, embodying the principles of the present invention. The apparatus 10 comprises a frame assembly, generally indicated at 12, a feed tray assembly, generally indicated at 14, and an exit tray assembly, generally indicated at 16. As best shown in FIGS. 3 and 7, the laminating and adhesive transfer apparatus 10 also includes a set of nip rollers, generally indicated at 18, designed to engage each other in a rolling relation and feed layers of substrate or film through the laminating and adhesive transfer apparatus 10 and exert pressure on the layers.

The frame assembly 12 includes a metal base plate 20, as best shown in FIGS. 3 and 7, and a pair of generally vertical side walls 22 made of plastic which are disposed parallel to one another and extend upward in a generally vertical direction. The generally vertical side walls 22 are connected to one another by three steel rods 24 as best shown in FIG. 3. The steel rods extend transversely across the laminating and adhesive transfer apparatus 10 and are fixed to each of the side walls by screws 26 which are inserted through apertures in the side walls 22 corresponding to the location of the steel rods 24.

The frame assembly 12 also includes a plastic back cover 28. The back cover 28 extends transversely across the laminating and adhesive transfer apparatus 10 between the vertical side walls 22 and extends upwardly and inwardly from the left edge of the base plate 20 as viewed in FIG. 3. A top cover 30 constructed of plastic extends transversely between the side walls 22 extends across the length of the top edges of the side walls 22. A portion 32 of the top cover 30 also extends downwardly and inwardly from the left side of the top edges of the side walls 22 as viewed in FIG. 3.

The front side of the laminating and adhesive transfer apparatus 10 has an opening 33 configured so that it may receive a cartridge containing a supply roll of adhesive web material or laminate film and a feed tray assembly 14, each of which shall be discussed below. As shown in FIG. 1, the rear side of the laminating and adhesive transfer apparatus 10 also has a discharge opening 35 between the downwardly and inwardly extending portion 32 of the top cover 30 and the upper edge of the back cover 28.

Figure 8:
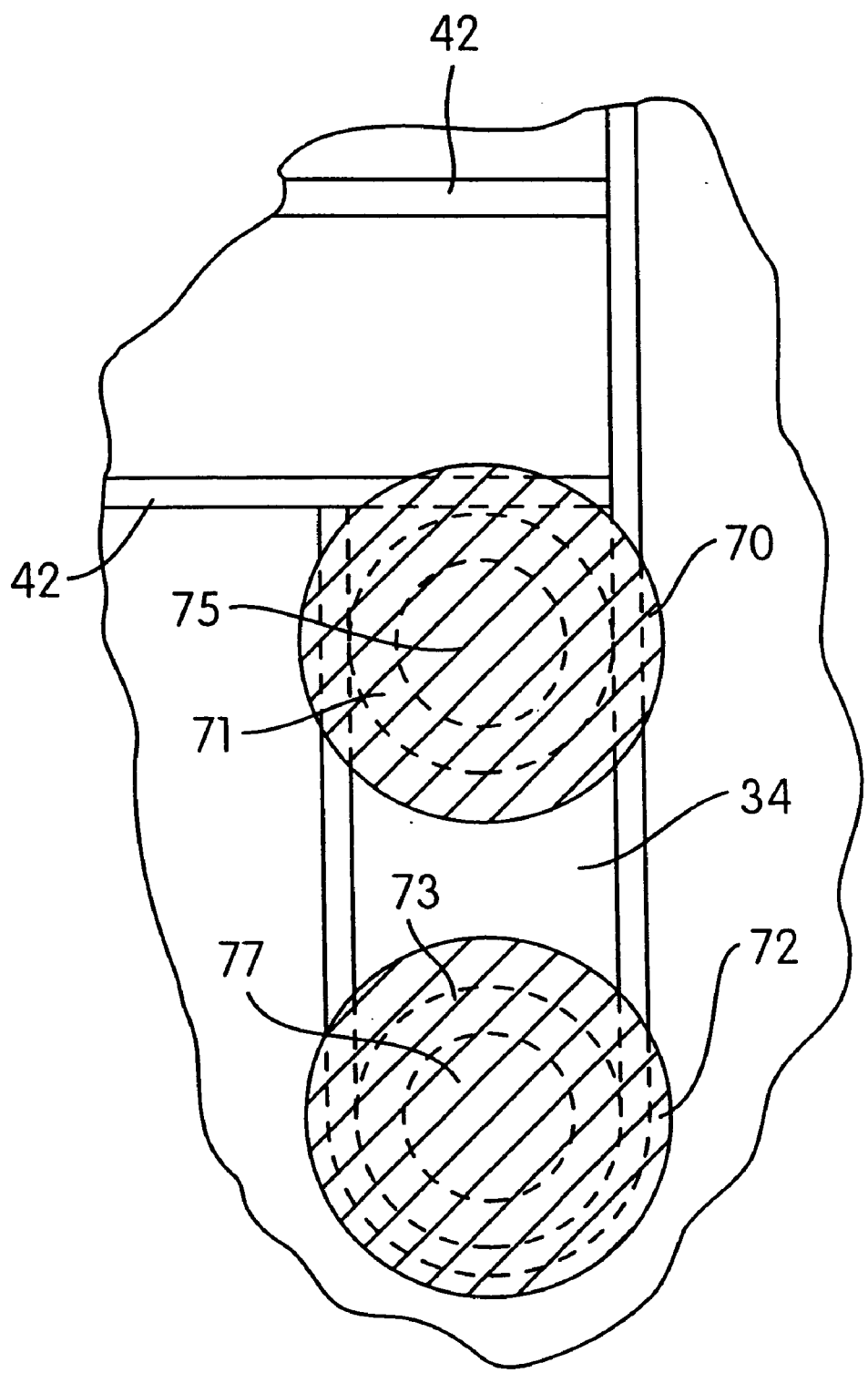
FIG. 8 is a sectional view along line 8—8 of FIG. 2.

On the interior of each side wall 22 is an upwardly facing U-shaped nip roller receiving slot 34 as best seen in FIG. 8. The U-shaped slot 34 is designed to rotatably receive axles 75, 77 of an upper roller 36 and a lower roller 38 which extend transversely between the side frame walls 22 and comprise the set of rollers 18. The upper and lower rollers 36, 38 are disposed one above another with their respective axles 75, 77 retained in the U-shaped slot 34.

Spring slots 40 defined by inwardly projecting ribs on each of the side walls 22, as best shown in FIG. 3, extend inwardly from the discharge opening 35 in the rear side of the apparatus 10. Each spring slot 40 extends inwardly to the U-shaped slot 34. A U-shaped spring 42 is snugly fit into each spring slot 40 such that the legs of the U-shaped spring 42 extend away from the discharge opening 35 in the rear of the apparatus 10 and across the top of the upwardly facing U-shaped slot 34. By extending across the top of the U-shaped slots 34, each U-shaped spring 42 contacts the uppermost portions of the axles 75 of the upper roller 36, as best shown in FIG. 8, and applies pressure thereto, thereby retaining the set of rollers 18 in the upwardly facing U-shaped slots 34.

Figure 4:
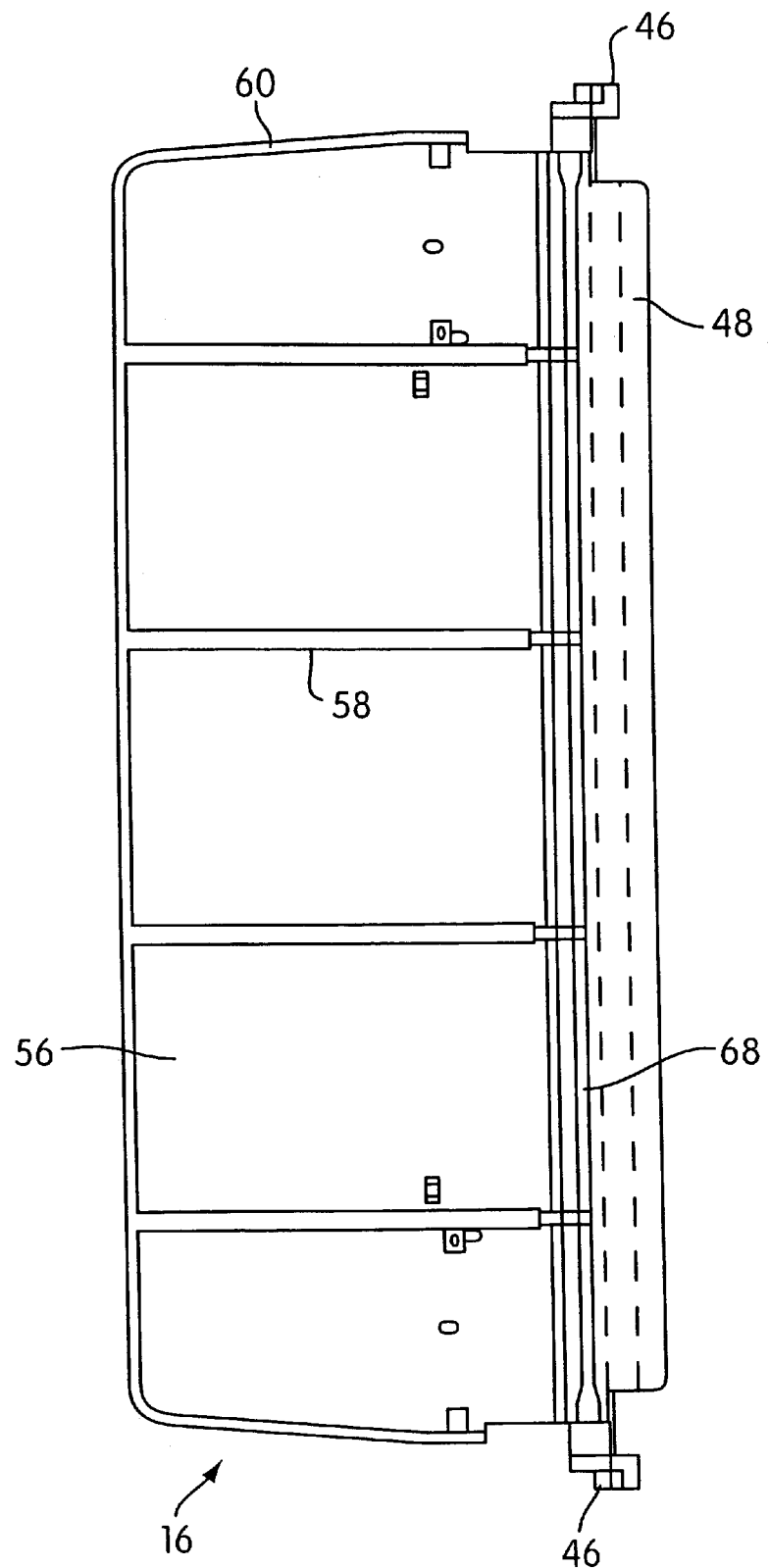
FIG. 4 is a top plan view of an exit tray assembly used in conjunction with a laminating and adhesive transfer apparatus embodying the principles of the present invention.
Figure 5:
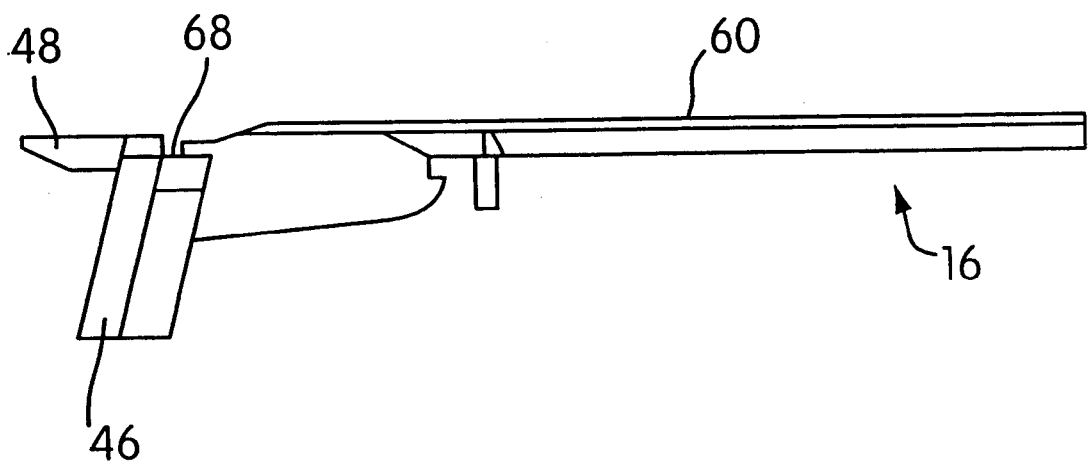
FIG. 5 is a profile view of the exit tray assembly shown in FIG. 4.

An upwardly facing generally rectangular slot 44 as shown in FIG. 3 extends downwardly from the spring slot 40 at a position immediately inward from the discharge opening 35 on each of the side walls 22. An exit tray assembly 16 as shown in FIGS. 4 and 5 has a set of mounting tabs 46 extending outwardly therefrom adjacent a tapered forward edge 48. The mounting tabs 46 are configured to be received in the generally rectangular exit tray receiving slot 44 on each side wall 22. A cutting assembly 50 includes a steel cutter bar 52 and a slidable blade mounting structure 54 slidably mounted on the cutter bar 52. The cutter bar 52 is also configured to be received in the generally rectangular slot 44. The generally rectangular slot 44 opens upwardly to the spring slot 40 such that when the U-shaped spring 42 is mounted in the spring slot 40 of each side wall 22 the bottom leg of the U-shaped spring 42 contacts the cutter bar 52, thereby retaining and mounting the cutting assembly 50 and the exit tray assembly 16 in the laminating and adhesive transfer apparatus 10.

The exit tray assembly 16 is constructed of plastic and has a generally rectangular substrate supporting surface 56 with a plurality of generally parallel ridges 58 thereon extending longitudinally away from the nip rollers. A lip 60 having the same height as the aforementioned ridges 58 extends around the periphery of the exit tray assembly 16 on three sides. The supporting surface 56 of the exit tray assembly 16 is textured. The tapered forward edge 48 of the exit tray assembly 16 extends inwardly into the discharge opening 35 and is disposed immediately adjacent the discharge side of the nip area defined at the point where the upper and lower rollers 36, 38 meet.

The exit tray assembly 16 is configured to receive a finished product of a laminating or adhesive transfer operation performed by the apparatus 10. As the finished product is fed through the set of rollers 18, the exit tray assembly 16 receives and supports the finished product in a generally horizontal orientation. The ridges 58 support the finished product slightly above the surface 56. By supporting the finished product in a generally horizontal orientation, the exit tray assembly 16 enhances the laminating or adhesive transfer process by preventing the finished product from falling downward and bending or curling due to a shrinkage differential which occurs in the manufacturing of the substrate layers used to make the finished product. By eliminating bending or curling of the finished product, the exit tray assembly 16, in conjunction with the laminating and adhesive transfer apparatus 10, provides a straighter and flatter finished product which is generally more desirable than a bent or curled finished product.

As can be seen from this description, the use of the exit tray assembly 16 is not limited to the particular laminating and adhesive transfer apparatus 10 described herein. It can be seen that an exit tray assembly 16 embodying the principles of the present invention may be used with other laminating and adhesive transfer devices such as those disclosed in U.S. Pat. Nos. 5,584,962 and 5,580,417, both of which are hereby incorporated into the present application by reference.

Figure 2:
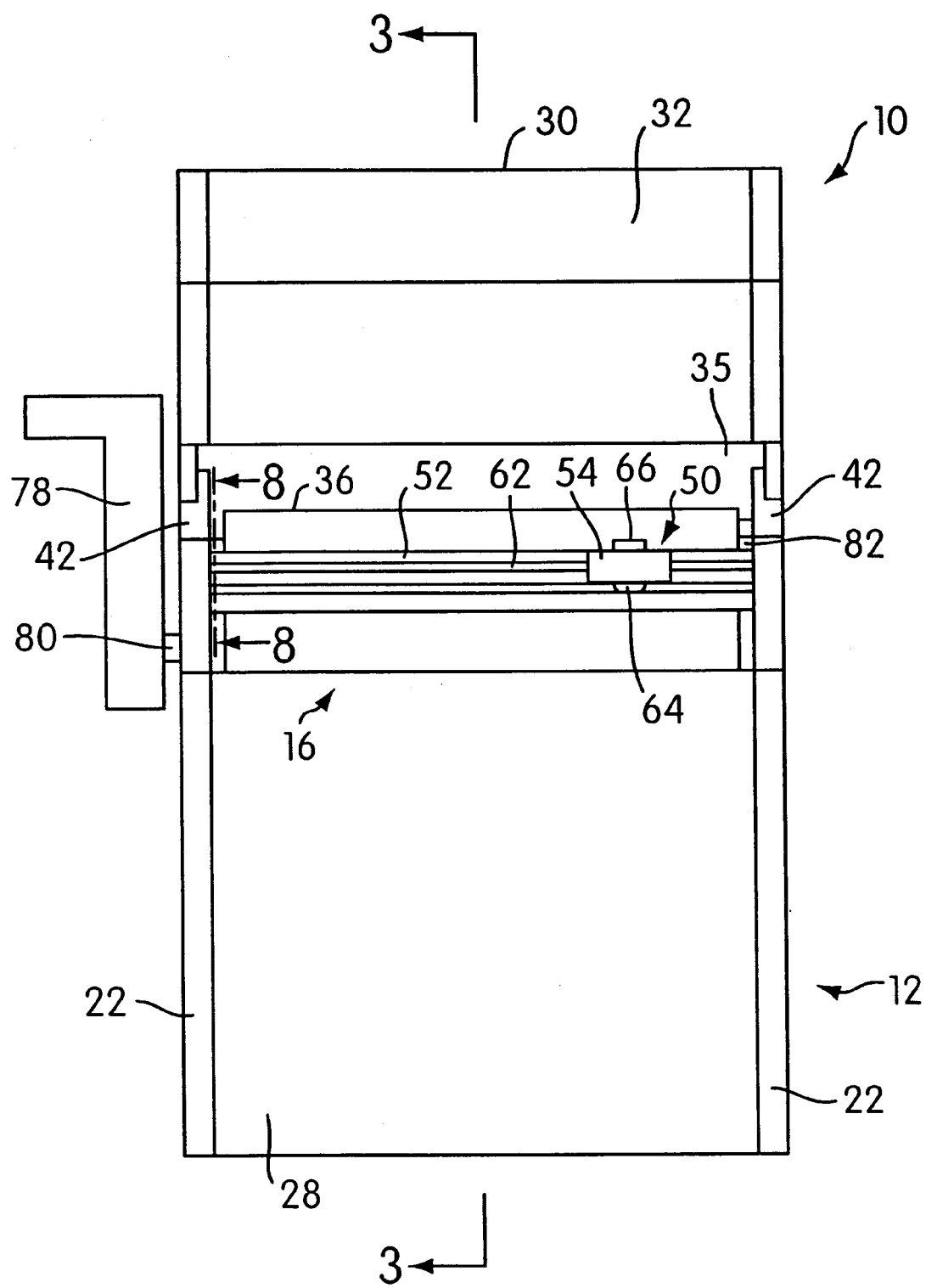
FIG. 2 is a front plan view of the laminating and adhesive transfer apparatus shown in FIG. 1.

As shown in FIGS. 1 and 2, the cutter bar 52 extends transversely between the side walls 22. A groove 62, best seen in FIGS. 1 and 2, extends along the length of the cutter bar 52 and is configured to engage the slidable blade mounting structure 54. A blade 64 extends downwardly from the blade mounting structure 54. A tab (not shown) extends inwardly from the blade mounting structure 54 and is inserted through a hole (not shown) formed at the top of the blade 64 and is slidably engaged in the groove 62. The slidable blade mounting structure 54 has a front side, a back side, and a top side which are formed together continuously and open downwardly to fit over the upper edge of the cutter bar 52 as shown in FIG. 1 with the aforementioned tab slidably engaged in the groove 62. A tab 66 extends outwardly from the slidable blade mounting structure 54 to facilitate operation of the cutting assembly 50. Thus, the slidable blade mounting structure 54 can be slid transversely with respect to the apparatus 10 along the length of the cutter bar 52 between the side walls 22.

As best shown in FIGS. 1, 3, 5, and 7, a groove 68 is formed on the exit tray assembly 16 immediately to the rear of the forward tapered edge 48. The groove 68 extends transversely across the surface 56 of the exit tray assembly 16. The groove 68 is configured such that the blade 64 of the cutting assembly 50 extends downward and a portion thereof is received in the groove 68. The cutting assembly 50, in conjunction with the groove 68 on the exit tray assembly 16, enhances cutting of the finished product by enabling the blade 64 to cut through the entire finished product by configuring the cutter assembly 50 such that the blade 64 extends downward into the groove 68 and extends below the upper surface 56 of the exit tray assembly 16. Additionally, by supporting the finished product in a generally horizontal orientation, the exit tray assembly 16 also enhances cutting of the finished product by insuring that the severed edge of the product is straight rather than angled, as it would be if the product were allowed to curl or bend.

Referring to FIG. 3, the upper and lower rollers 36, 38 each include an elongated steel shaft 70, 72 and a rubber outer cover 74, 76 extending the length of the shaft 70, 72. As best shown in FIG. 7, each shaft 70, 72 has axles 75, 77 extending axially with respect to the shaft 70, 72 from opposite ends. Bushings 71, 73 fit on the ends of the axles 75, 77. These bushings 71, 73 are configured to be snugly fit in the upwardly facing U-shaped slot 34, thereby allowing the set of rollers 18 to be rotatably mounted in the upwardly facing U-shaped slot 34 as discussed above.

As is best seen in FIGS. 2 and 7, the laminating and adhesive transfer apparatus 10 also includes a crank handle 78. The crank handle has a shaft 80 which extends inwardly through side wall 22 to the interior of the apparatus 10 and is disposed within the upwardly facing U-shaped slot 34. Although not shown, the end of the shaft 80 disposed within the upwardly facing U-shaped slot 34 is threaded. The axle 77 of the lower roller 38 has a threaded bore (not shown) which is configured to receive the threaded end of the shaft 80 of the crank handle 78, thereby operatively connecting the crank handle 78 to the lower roller 38.

The axle 77 of the lower roller 38 opposite the crank handle 78 is knurled such that a set of axially extending grooves (not shown) are disposed about the circumference of the axle 77 immediately adjacent the aforementioned bushing 73. The knurled portion of the axle 77 is configured to fixedly receive a pinion gear 81 thereon. Likewise, the axle 75 of the upper roller 36 is knurled such that a set of axially extending grooves (not shown) are disposed about the circumference of the axle 75 immediately adjacent the aforementioned bushing 71. A pinion gear 82 is fixedly mounted upon the knurled portion of the axle 75 of the upper roller 36. The pinion gear 81 of the lower roller 38 and the pinion gear 82 of the upper roller 36 are constructed and arranged to engage one another such that manually operating the crank handle 78 rotates both the upper and lower rollers 36, 38. The rollers 36, 38 rotate in opposite directions with respect to one another thereby allowing layers of substrate or film to be fed into the nip area of the rollers 36, 38 and fed through the rollers 36, 38 as the crank handle 78 is turned. It is also contemplated that the set of rollers 18 may be driven by an electric motor or other similar powered actuating means rather than by manual operation of the crank handle 78.

The feed tray assembly 14 has a planar upper surface 88 and projections 90 extending outwardly from each side. The outwardly extending projections 90 are removably insertable in slots 92 formed on the forward edge of the side walls 22. The feed tray assembly 14 also has a wiper bar 94 which extends transversely across the planar upper surface 88 of the feed tray assembly 14. The wiper bar 94 is pivotally mounted to the sides of the feed tray assembly 14 by projections 96 which are removably inserted into slots 98 formed in the side walls of the feed tray assembly 14. As a master is fed into the nip area of the set of rollers 18, the wiper bar 94 lightly engages the master as it passes between the wiper bar 94 and the upper planar surface 88 of the feed tray assembly 14. The wiper bar 94 serves several functions and cleans, smoothes, and guides the master as it enters the nip area between the rollers 36, 38. A particularly important function of the wiper bar 94 is to tension the master and keep it flat and aligned with the laminate or adhesive webs resulting in better alignment, especially when feeding the masters intermittently.

Figure 6:
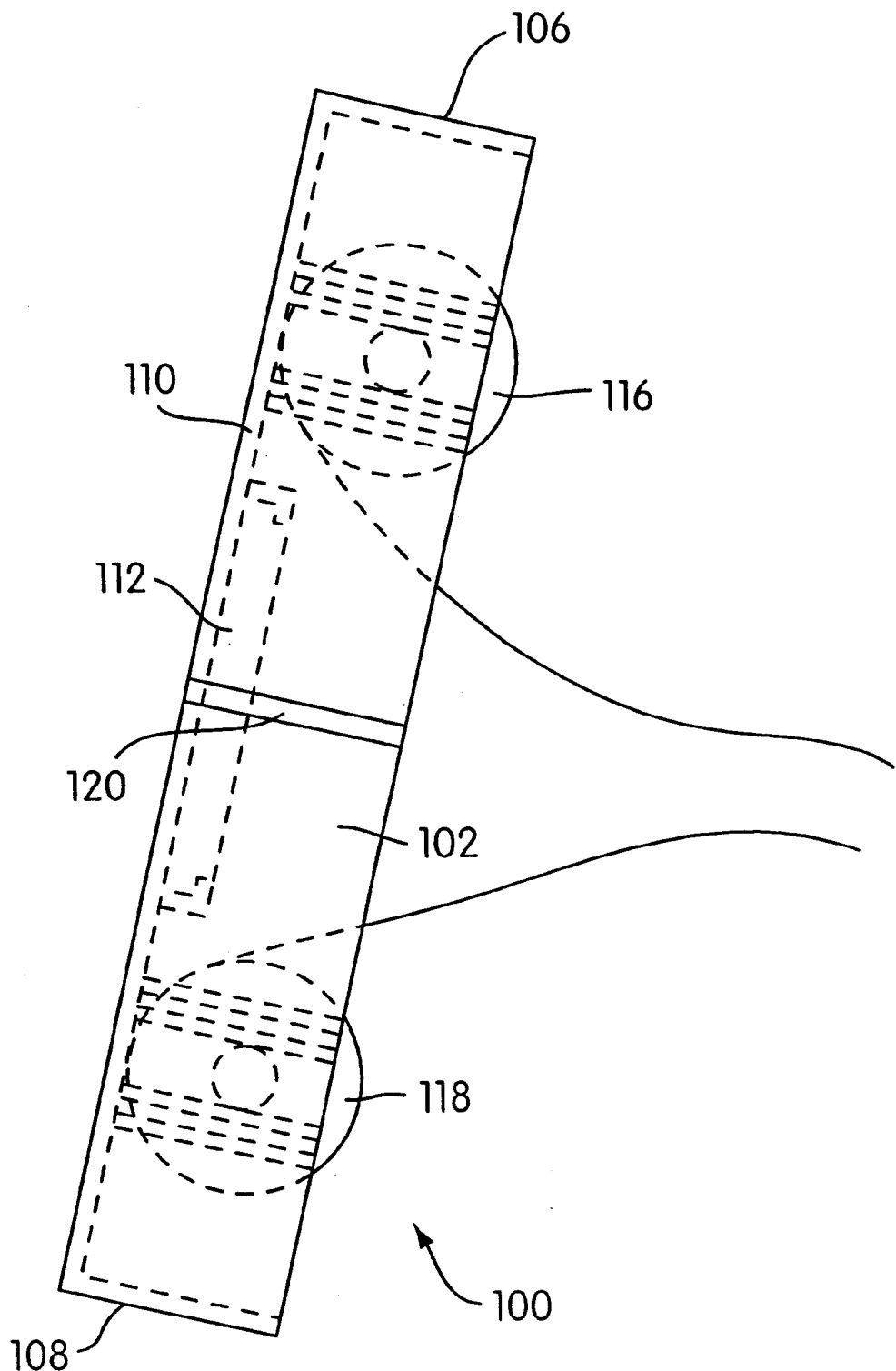
FIG. 6 is a profile view of a supply cartridge used in conjunction with a laminating and adhesive transfer apparatus embodying the principles of the present invention.

It is contemplated that in the present invention, various substrates may be provided to the user in a self contained, ready-to-use cartridge 100 which allows the user simply to select and insert the appropriate cartridge. As indicated above, the apparatus of the present invention can be used for multiple purposes including both adhesive transfer and lamination. The cartridge is generally indicated at 100 and includes a frame having opposite side walls 102, a top wall 106, a bottom wall 108, and a front wall 110 having a substantial rectangular opening 112. As shown in FIG. 6, the cartridge 100 includes an upper feed roll 116 and lower feed roll 118 each containing a roll of film or other flexible substrate material. The upper and lower feed rolls 116, 118 may be pretensioned by the means disclosed in U.S. Pat. No. 5,580,417.

Thus, it will be seen that inserting a supply of suitable feed substrate is easily accomplished. The user simply selects the appropriate cartridge 100 and positions the cartridge 100 in the opening 33 of the front side of the apparatus 10. The cartridge 100 has outwardly extending projections 120 on each side wall 102 which are slidably received in a set of inwardly projecting guiding ribs 122 on each of the side walls 22 of the apparatus 10. The side walls 102 of the cartridge 100 contact circular projections 124, 126 which extend inwardly from each of the side walls 22. As can be seen from FIG. 7, the inwardly extending circular projections 124, 126 and the guiding ribs 122 support the cartridge 100 inside the laminating and adhesive transfer apparatus 10.

As shown in FIG. 7, the feed tray assembly 14 is inserted in a generally horizontal position extending through the opening 112 formed in the front wall 110 of the cartridge 100 with the projections 90 removably inserted in the slots 92 on the side walls 22. The master is aligned on the upper surface 88 of the feed tray assembly 14 with the leading free edge of the master positioned between the inner surfaces of the materials supplied by the lower feed roll 118 and the upper feed roll 116 of the cartridge 100. The master, the feed materials supplied by the upper supply feed roll 116, and the materials supplied by the lower feed roll 118 are fed into the nip area of the set of rollers 18. The operator then actuates the machine by operating the crank handle 78 which rotates the lower roller 36 and the upper roller 38 as discussed above. The master is smoothed, guided, and wiped clean as it passes between the wiper bar 94 and the upper surface 88 of the feed tray assembly 14. The master proceeds between the set of rollers 18 and the finished product is fed to the tapered forward edge 48 of the exit tray assembly 16. The exit tray assembly 16 supports the finished product in a generally horizontal orientation to preventing curling and bending of the finished product as discussed above. When it is desired to cut the finished product, the blade mounting structure 54 may be slid transversely across the cutter bar 52 such that the blade 64 is moved transversely within the groove 68 and cuts through the entire thickness of the finished product in one pass.

By way of example, the lower feed roller 118 may comprise a flexible film with an adhesive coating. The upper feed roller 116 comprises a supply of film which has an affinity for adhesive. The upper and lower films are fed between the set of rollers 18. The feed tray assembly 14 is placed in position and a pre-printed master such as a master containing labels repetitively printed on a sheet can be fed via the feed tray assembly 14 to the nip area of the set of rollers 18 between the upper planar surface 88 and the wiper bar 94. Adhesive will be transferred from the bottom film to the labels with the excessive adhesive being picked up by the top film. The labels are now provided with an adhesive and are attached to the lower film and may be severed from one another by the cutter assembly 50 at the discharge opening 35. The labels may then be peeled from the film substrate when desired.

While the principles of the invention have been made clear in the illustrative embodiments set forth above, it will be obvious to those skilled in the art to make various modifications to the structure, arrangement, proportion, elements, materials, and components used in the practice of the invention.

Any U.S. Patents or patent applications mentioned herein above and not specifically incorporated by reference are hereby incorporated into the present application by reference.

It should be noted that the use of claim language in the "means for performing a specified function" format of 35 U.S.C. §112, paragraph 6, has been omitted from the appended claims. This is to make clear that the applicant does not intend the appended claims to be interpreted under §112, paragraph 6, so as to be limited solely to the structures disclosed in the specification or their structural equivalents.

What is claimed is:

1. A master processing apparatus for use with a pair of removable feed rolls, the removable feed rolls carrying a supply of stock material to be unwound, at least one of the stock materials having a layer of adhesive provided thereon, said apparatus comprising:

a frame constructed and arranged to removably mount the feed rolls;

a master processing assembly;

an actuator constructed and arranged to affect operation of said master processing assembly;

said frame being constructed and arranged such that, when the feed rolls are removably mounted thereto, a master can be inserted into said master processing assembly together with the stock materials unwound from their respective feed rolls and disposed on opposing sides of the master;

said master processing assembly being constructed and arranged to perform a master processing operation wherein said processing assembly causes adhesive bonding between the master and stock materials and subsequently discharges the processed master and stock materials outwardly therefrom;

an exit tray providing a substrate supporting surface that extends outwardly from said frame adjacent said discharge side of said nip rollers, said exit tray being positioned and configured such that said substrate supporting surface receives and supports the processed master and stock materials being discharged from the master processing assembly in a substantially flat relation outside of said frame to thereby prevent downward bending of the processed master and stock materials as they are discharged from said master processing assembly.

2. An apparatus according to claim 1, wherein said substrate supporting surface has a plurality of generally parallel ridges extending longitudinally away from said master processing assembly, said ridges being configured to support the processed master and stock materials in spaced apart relation to the portions of said surface extending between said ridges.

3. An apparatus according to claim 2, wherein said exit tray is plastic.

4. An apparatus according to claim 1, wherein said exit tray has a tapered edge extending into the discharge side of said nip area.

5. An apparatus according to claim 1, further comprising a feed tray disposed adjacent said master processing assembly opposite said exit tray, said feed tray providing a master supporting surface positioned and configured to guide and support the master as it is being fed into said master processing assembly.

6. An apparatus according to claim 5, wherein said feed tray includes a wiper bar positioned and configured to engage an upwardly facing surface of the master on the master supporting surface so as to wipe debris from the upwardly facing surface and smooth the master as it is being fed into said master processing assembly.

7. An apparatus according to claim 1, further comprising a cutting assembly disposed on the same side of said master processing assembly as said exit tray;

said cutting assembly being positioned and configured to cut transversely through the processed master and stock materials being supported in substantially flat relation on said exit tray so as to separate a portion of the processed master and stock materials from the portion being discharged from said master processing assembly.

8. An apparatus according to claim 7, wherein said cutting assembly comprises a blade mounted for transverse cutting movement in a transverse direction of said tray.

9. A master processing apparatus for use with a pair of removable feed rolls, the removable feed rolls carrying a supply of stock material to be unwound, at least one of the stock materials having a layer of adhesive provided thereon, said apparatus comprising:

a frame constructed and arranged to removably mount the feed rolls;

a master processing assembly;

an actuator constructed and arranged to affect operation of said master processing assembly;

said frame being constructed and arranged such that, when the feed rolls are removably mounted thereto, a master can be inserted into said master processing assembly together with the stock materials unwound from their respective feed rolls and disposed on opposing sides of the master;

said master processing assembly being constructed and arranged to perform a master processing operation wherein said processing assembly causes adhesive bonding between the master and stock materials being fed therein and subsequently discharges the processed master and stock materials outwardly therefrom;

an exit tray providing a substrate supporting surface positioned and configured to receive and support the processed master and stock materials being discharged from the nip rollers in a substantially flat relation to thereby prevent downward bending of the processed master and stock materials;

a cutting assembly disposed on the same side of said master processing assembly as said exit tray, said cutting assembly being constructed and arranged to cut transversely through the processed master and stock materials being supported in substantially flat relation on said exit tray;

said exit tray comprising a groove formed in said substrate supporting surface and extending in said transverse direction;

said cutting assembly having a blade mounted such that a portion thereof extends downwardly into said groove and below said supporting surface, the downward extent of said blade portion enabling said blade to cut through an entire thickness of the processed master and stock materials during said transverse cutting movement.

10. An apparatus according to claim 9, wherein said cutting assembly further comprises a transversely extending cutter bar, said blade being mounted for sliding movement along said cutter bar.

11. An apparatus according to claim 10, wherein said cutting assembly comprises a blade mounting structure, said blade mounting structure being slidably mounted on said cutter bar and said blade being removably mounted to said mounting structure, the removable mounting of said blade enabling replacement of said blade when said blade becomes dull.

12. An apparatus according to claim 11, wherein said cutter bar has a groove extending in said transverse direction and said blade mounting structure has a mounting tab;

said blade being removably mounted by removably inserting said mounting tab through a hole in said blade and removably mounting said mounting structure on said cutter bar such that said mounting tab extends through said blade hole and into said groove.

13. An apparatus according to claim 11, wherein said substrate supporting surface has a plurality of generally parallel ridges extending longitudinally away from said master processing assembly, said ridges being configured to support the processed master and stock materials in space apart relation to the portions of said planar surface extending between said ridges.

14. An apparatus according to claim 13, wherein said exit tray is plastic.

15. An apparatus according to claim 11, wherein said exit tray has a tapered edge extending into the discharge side of said nip area.

16. An apparatus according to claim 11, further comprising a feed tray disposed adjacent said master processing assembly opposite said exit tray, said feed tray providing a master supporting surface positioned and configured to guide and support the master as it is being fed into said master processing assembly.

17. An apparatus according to claim 16, wherein said feed tray includes a wiper bar positioned and configured to engage an upwardly facing surface of the master on said master supporting surface so as to wipe debris from the upwardly facing surface and smooth the master as it is being fed into said master processing assembly.

18. An apparatus according to claim 1, wherein the feed rolls are rotatably mounted in a removable cartridge, said frame being constructed and arranged to removably mount the feed rolls individually.

19. An apparatus according to claim 1, wherein said frame is constructed and arranged to removably mount the feed rolls individually.

20. A master processing apparatus for use with a pair of removable feed rolls, the removable feed rolls carrying a supply of stock material to be unwound, at least one of the stock materials having a layer of adhesive provided thereon, said apparatus comprising:

a frame constructed and arranged to removably mount the feed rolls;

a master processing assembly;

an actuator constructed and arranged to affect operation of said master processing assembly;

said frame being constructed and arranged such that, when the feed rolls are removably mounted thereto, a master can be inserted into said master processing assembly together with the stock materials unwound from their respective feed rolls and disposed on opposing sides of the master;

said master processing assembly being constructed and arranged to perform a master processing operation wherein said processing assembly causes adhesive bonding between the master and the stock materials being fed therein and subsequently discharges the processed master and stock materials outwardly therefrom;

a substrate supporting surface positioned and configured to receive and support a portion of the processed master and stock materials being discharged from the master processing assembly; and a cutting assembly disposed adjacent said supporting surface, said cutting assembly being constructed and arranged to be moved in a transverse direction so as to cut transversely through the processed master and stock materials being supported on said supporting surface, said cutting assembly having a blade with a portion thereof extending downwardly below said supporting surface, the downward extent of said blade portion enabling said blade to cut through an entire thickness of the processed master and stock materials during the aforesaid transverse cutting movement, wherein said supporting surface has a groove extending in said transverse direction, said blade portion being received in said groove.

21. An apparatus according to claim 20, wherein said cutting assembly further comprises a transversely extending cutter bar, said blade being mounted for sliding movement along said cutter bar.

22. An apparatus according to claim 21, wherein said cutting assembly comprises a blade mounting structure, said blade mounting structure being slidably mounted on said cutter bar and said blade being removably mounted to said mounting structure, the removable mounting of said blade enabling replacement of said blade when said blade becomes dull.

23. An apparatus according to claim 22, wherein said cutter bar has groove extending in said transverse direction and said blade mounting structure has a mounting tab, said blade being removably mounted by removably inserting said mounting tab through a hole in said blade and removably mounting said mounting structure on said cutter bar such that said mounting tab extends through said blade hole and into said groove.

24. An apparatus according to claim 20, further comprising an exit tray providing said supporting surface and said groove.

25. An apparatus according to claim 7, wherein the feed rolls are rotatably mounted in a removable cartridge, said frame being constructed and arranged to removably mount the removable cartridge.

26. An apparatus according to claim 20, wherein said frame is constructed and arranged to removably mount the feed rolls individually.

27. An apparatus according to claim 1, wherein said adhesive is pressure-sensitive and said master processing assembly includes first and second cooperating structures which are constructed and arranged to apply pressure to the master and stock materials fed therein so as to cause said adhesive bonding and perform said master processing operation without the use of heat transfer.

28. An apparatus according to claim 27, wherein said first and second cooperating structures are a pair of nip rollers.

29. An apparatus according to claim 9, wherein said adhesive is pressure-sensitive and said master processing assembly includes first and second cooperating structures which are constructed and arranged to apply pressure to the master and stock materials fed therein so as to cause said adhesive bonding and perform said master processing operation without the use of heat transfer.

30. An apparatus according to claim 29, wherein said first and second cooperating structures are a pair of nip rollers.

31. An apparatus according to claim 11, wherein said adhesive is pressure-sensitive and said master processing assembly includes first and second cooperating structures which are constructed and arranged to apply pressure to the master and stock materials fed therein so as to cause said adhesive bonding and perform said master processing operation.

32. An apparatus according to claim 31, wherein said first and second cooperating structures are a pair of nip rollers.

33. An apparatus according to claim 7, wherein the adhesive layer is formed from a pressure-sensitive adhesive and wherein said master processing assembly is constructed and arranged to perform the master processing operation without the use of heat transfer by applying pressure to the master and stock materials fed therein.

34. An apparatus according to claim 20, wherein said master processing assembly includes first and second cooperating structures which are constructed and arranged to apply pressure to the master and stock materials fed therebetween so as to cause said adhesive bonding.

35. An apparatus according to claim 20, wherein said first and second cooperating structures are a pair of rotatable nip rollers.

36. An apparatus according to claim 35, wherein said cutting assembly further comprises a transversely extending cutter bar, said blade being mounted for sliding movement along said cutter bar.

37. An apparatus according to claim 4, wherein said cutter bar has groove extending in said transverse direction and said blade mounting structure has a mounting tab, said blade being removably mounted by removably inserting said mounting tab through a hole in said blade and removably mounting said mounting structure on said cutter bar such that said mounting tab extends through said blade hole and into said groove.

38. An apparatus, according to claim 2, further comprising an exit tray providing said supporting surface and said groove.

39. An apparatus according to claim 20, wherein the feed rolls are rotatably mounted in a removable cartridge, said frame being constructed and arranged to removably mount the removable cartridge.

40. An apparatus according to claim 20, wherein said frame is constructed and arranged to removably mount the feed rolls individually.

41. An apparatus according to claim 32, wherein said actuator is a manually rotatable crank handle disposed exteriorly of said frame, said crank handle being operatively connected to said nip rollers such that manual rotation of said crank handle affects said nip roller rotation.

42. An apparatus according to claim 41, wherein said crank handle is directly connected to one of said nip rollers.

43. An apparatus according to claim 42, wherein said crank is threadingly engaged with an axle of said one nip roller such that both said crank handle and said one nip roller rotate coaxially.

44. An apparatus according to claim 41, wherein said nip rollers are covered by rubber sleeves.

45. An apparatus according to claim 41, wherein said frame comprises a pair of opposing side walls, each of said side walls having a generally vertically extending nip roller receiving slot on an interior surface thereof, said slots being positioned and configured such that axles extending from opposing ends of both said nip rollers are inserted into said slots to rotatably mount said nip rollers to said frame;

said apparatus further comprising a pair of springs being removably mounted to said frame adjacent said slots and being positioned and configured to engage the axles of an upper one of said rotatably mounted nip rollers to thereby removably maintain said nip rollers in said slots.

46. An apparatus according to claim 45, wherein said springs are U-shaped with one leg thereof engaging an axle of said upper one of said nip rollers.

47. An apparatus according to claim 46, wherein each of said frame side walls have exit tray receiving slots on said interior surfaces thereof;

said exit tray having a pair of generally outwardly extending mounting tabs positioned and configured to be removably received in said exit tray receiving slots.

48. An apparatus according to claim 32, wherein said actuator is a manually rotatable crank handle disposed exteriorly of said frame, said crank handle being operatively connected to said nip rollers such that manual rotation of said crank handle affects said nip roller rotation.

49. An transfer apparatus according to claim 48, wherein said crank handle is directly connected to one of said nip rollers.

50. An transfer apparatus according to claim 49, wherein said crank handle is threadingly engaged with an axle of said one nip roller such that both said crank handle and said one nip roller rotate coaxially.

51. An transfer apparatus according to claim 48, wherein said nip rollers are covered by rubber sleeves.

52. An apparatus according to claim 48, wherein said frame comprises a pair of opposing side walls, each of said side walls having a generally vertically extending nip roller receiving slot on an interior surface thereof, said slots being positioned and configured such that axles extending from opposing ends of both said nip rollers are inserted into said slots to rotatably mount said nip rollers to said frame, said apparatus further comprising a pair of springs being removably mounted to said frame adjacent said slots and being positioned and configured to engage the axles of an upper one of said rotatably mounted nip rollers to thereby removably maintain said nip rollers in said slots.

53. An apparatus according to claim 52, wherein said springs are U-shaped with one leg thereof engaging an axle of said upper one of said nip rollers.

54. An apparatus according to claim 53, wherein each of said frame side walls have exit tray receiving slots on said interior surfaces thereof, said exit tray having a pair of generally outwardly extending mounting tabs positioned and configured to be removably received in said exit tray receiving slots.

55. An transfer apparatus according to claim 54, wherein opposing ends of said cutter bar are mounted in said exit tray receiving slots above said exit tray mounting tabs.

56. An apparatus according to claim 55, wherein said one leg of said U-shaped spring engages said cutter bar to thereby maintain said cutter bar and said exit tray in said exit tray receiving slots.

57. A master processing apparatus for use with a pair of removable feed rolls, the removable feed rolls carrying a supply of stock material to be unwound, at least one of the stock materials having a layer of adhesive provided thereon, said apparatus comprising:

a frame constructed and arranged to removably mount the feed rolls;

a master processing assembly;

an actuator constructed and arranged to affect operation of said master processing assembly;

said frame being constructed and arranged such that, when the feed rolls are removably mounted thereto, a master can be inserted into said master processing assembly together with the stock materials unwound from their respective feed rolls and disposed on opposing sides of the master;

said master processing assembly being constructed and arranged to perform a master processing operation wherein said processing assembly causes adhesive bonding between the master and stock materials being fed therein and subsequently discharges the processed master and stock materials outwardly therefrom; and an exit tray providing a substrate supporting surface positioned and configured to receive and support the processed master and stock materials being discharged from the master processing assembly in a substantially flat relation to thereby prevent downward bending of the processed master and stock materials, wherein said substrate supporting surface has a plurality of generally parallel ridges extending longitudinally away from said master processing assembly, said ridges being configured to support the processed master and stock materials in spaced apart relation to the portions of said surface extending between said ridges.

58. An apparatus according to claim 57, wherein said exit tray is plastic.

59. An apparatus according to claim 57, wherein the adhesive layer is formed from a pressure-sensitive adhesive and wherein said master processing assembly is constructed and arranged to perform the master processing operation without the use of heat transfer by applying pressure to the master and stock materials fed therein.

60. A master processing apparatus for use with a pair of removable feed rolls, the removable feed rolls carrying a supply of stock material to be unwound, at least one of the stock materials having a layer of adhesive provided thereon, said apparatus comprising:

a frame constructed and arranged to removably mount the feed rolls;

a master processing assembly;

an actuator constructed and arranged to affect operation of said master processing assembly;

said frame being constructed and arranged such that, when the feed rolls are removably mounted thereto, a master can be inserted into said master processing assembly together with the stock materials unwound from their respective feed rolls and disposed on opposing sides of the master;

said master processing assembly being constructed and arranged to perform a master processing operation wherein said processing assembly causes adhesive bonding between the master and stock materials being fed therein and subsequently discharges the processed master and stock materials outwardly therefrom;

said master processing assembly including a pair of nip rollers which are constructed and arranged to apply pressure to the master and stock materials fed therein so as to cause said adhesive bonding and perform said master processing operation;

said frame comprising a pair of opposing side walls, each of said side walls having a generally vertically extending nip roller receiving slot on an interior surface thereof, said slots being positioned and configured such that axles extending from opposing ends of both said nip rollers are inserted into said slots to rotatably mount said nip rollers to said frame;

said apparatus further comprising a pair of springs being removably mounted to said frame adjacent said slots and being positioned and configured to engage the axis of an upper one of said rotatably mounted nip rollers to thereby removably maintain said nip rollers in said slots.

61. An apparatus according to claim 60, wherein said springs are U-shaped with one leg thereof engaging an axle of said upper one of said nip rollers.

62. An apparatus according to claim 60, wherein said apparatus is a laminating and adhesive transfer apparatus.

* * * * *